United States Patent [19]

Wood et al.

[11] Patent Number: 4,481,380

[45] Date of Patent: Nov. 6, 1984

[54] HIGH VOLTAGE INSULATOR FOR ELECTRICAL COMPONENTS HAVING TELESCOPING INSULATIVE SLEEVES

[75] Inventors: Theodore H. Wood, Bridgewater; John D. Swaffield, Brockton, both of Mass.

[73] Assignee: Alden Research Foundation, Brockton, Mass.

[21] Appl. No.: 411,704

[22] Filed: Aug. 26, 1982

[51] Int. Cl.³ ............................................. H05K 5/00
[52] U.S. Cl. ................................. 174/52 PE; 174/91; 174/DIG. 8; 29/855; 264/272.15; 264/272.18; 338/256; 338/275
[58] Field of Search ............ 174/52 PE, DIG. 8, 91; 337/186; 338/256, 257, 275; 264/272.15, 272.18; 29/855, 856, 858, 859

[56] References Cited

U.S. PATENT DOCUMENTS

| | | | |
|---|---|---|---|
| 1,683,067 | 9/1928 | Dubilier | 338/275 X |
| 2,713,700 | 7/1955 | Fisher | 264/129 |
| 3,044,127 | 7/1962 | Alden | 264/254 |
| 3,145,421 | 8/1964 | Colbert | 174/91 X |
| 3,226,463 | 12/1965 | Wallace | 174/52 PE X |

Primary Examiner—A. C. Prescott
Assistant Examiner—D. A. Tone
Attorney, Agent, or Firm—James H. Grover

[57] ABSTRACT

A high voltage electrical component can be insulated by placing such component into a first sleeve of preformed insulative material dimensioned to receive and telescope over the component. An internal abutment in the first sleeve positions the component for reception of both the first sleeve and component by a second sleeve of preformed insulative material dimensioned to receive and telescope over the first sleeve and component within. An internal abutment in the second sleeve further secures and centers the component and the first sleeve for subsequent encapsulation by insulative materials used with injection molding to form an outer insulative jacket. Once encapsulated within the insulative jacket the telescoping sleeves form a convoluted path outwardly from the component to the exterior of the jacket thereby minimizing high volt leakage.

6 Claims, 6 Drawing Figures

HIGH VOLTAGE INSULATOR FOR ELECTRICAL COMPONENTS HAVING TELESCOPING INSULATIVE SLEEVES

BACKGROUND

This invention relates to insulating high voltage electrical components utilizing well known insulative materials in high pressure injection molding.

While molding an insulative body or jacket around high voltage electrical components is old in industry, there is a perennial need to improve the articles and methods for minimizing or eliminating high volt leakage from electrical conductors, generally. The risk and attendant harm to humans and property from high voltage electricity leaked or arced from conductors is known.

It is therefore an object of the present invention to provide an improved high voltage insulator for electrical components and a method of making the components which minimizes high volt leakage therefrom to a greater degree than previously possible.

SUMMARY OF THE INVENTION

According to the invention an insulated high voltage electrical component comprises: a first sleeve of insulative material telescoping over the component; a second sleeve of insulative material telescoping over the first sleeve; and a body of insulative material molded around the sleeves to hold the sleeves in telescoped position, the telescoped sleeves forming a convoluted path outwardly from the component.

Also according to the invention a method for insulating a high voltage electrical component comprises: inserting the electrical component into a first sleeve of insulative material telescoping over the component; telescoping the first sleeve and electrical component into a second sleeve of insulative material; and encapsulating the sleeves with insulative material to form a molded body confining the sleeves and electrical component in telescoped position.

DRAWING

DESCRIPTION

Figure 1:
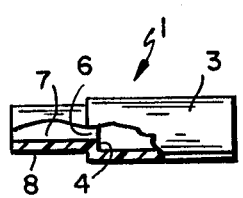
FIG. 1 is a side elevation, partly in section of an inner insulative sleeve.
Figure 2:
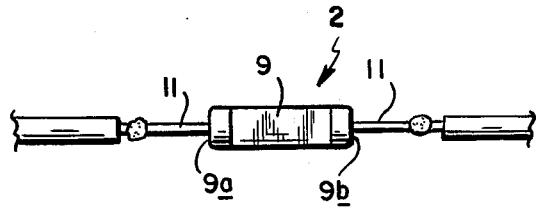
FIG. 2 is a side elevation of an electrical resistor.

FIG. 1 shows an elongate first sleeve 1 preformed of insulative material, such as polypropylene, and dimensioned to receive and telescope over a high voltage electrical component, such as a resistor 2 shown in FIG. 2. The first sleeve 1 comprises a narrow tubular body 3 having at one end an internal abutment wall 4 with an axial opening 6 that communicates with an axial passage 7 in a tubular neck 8 beyond the abutment 4.

The resistor 2 in FIG. 2 comprises a cylindrical body 9 having a first and second end, 9a and 9b respectively, from which first and second electrical leads, 11 extend axially. Either of the leads may be introduced into the tubular body 3 of the first sleeve 1 so that one end of the resistor will be engaged by the internal abutment 4 of the first sleeve 1 and the narrow tubular body 3 of the first sleeve 1 will telescope substantially over the entire length of the resistor body 9 with one lead extending through the opening 6 and neck passage 7. Usually the leads 11 are insulated.

Figure 3:
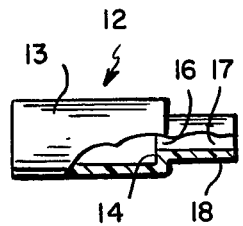
FIG. 3 is a side elevation, partly in section, of an outer insulative sleeve.

Shown in FIG. 3 is an elongate second sleeve 12 preformed of insulative material, such as polypropylene, and dimensioned to receive and telescope over the narrow tubular body 3 of the first sleeve 1 shown in FIG. 1. The second sleeve comprises a wide tubular body 13 having an internal abutment 14 defining an orifice 16 that communicates with a passage 17 in a neck 18 adjacent to the abutment 14.

With the resistor 2 inserted and properly installed within the narrow tubular body 3 of the first sleeve 1, such that either the first or second end, 9a or 9b, of the resistor body 9 engages the internal abutment 4 of the first sleeve 1, the first sleeve 1 is then inserted and positioned in the wide tubular body 13 of the second sleeve 12 so that the end of the resistor body 9 not engaging the internal abutment 4 of the first sleeve 1 is engaging the internal abutment 14 of the second sleeve 12. The second sleeve 12, containing the first sleeve 1 and resistor 2, telescopes substantially over the entire length of the narrow tubular body 3 of the first sleeve 1 to form a convoluted path 19, shown in FIG. 6, outwardly from the resistor 2 to the exterior of an outer insulative body or jacket 21 shown in FIGS. 4, 5 and 6. The second resistor lead extends through the second sleeve opening 16 and passage 17.

Figure 4:
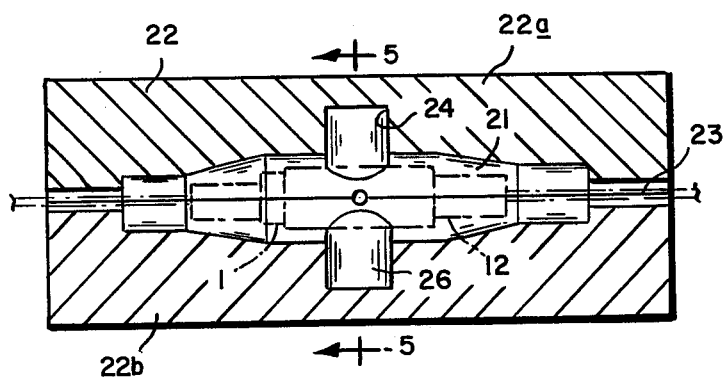
FIG. 4 is a side elevation of an injection mold.
Figure 5:
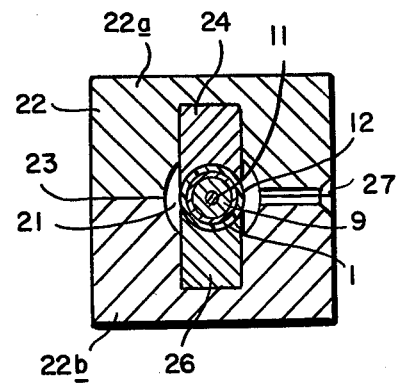
FIG. 5 is a sectional view of FIG. 4 taken on line 5—5.
Figure 6:
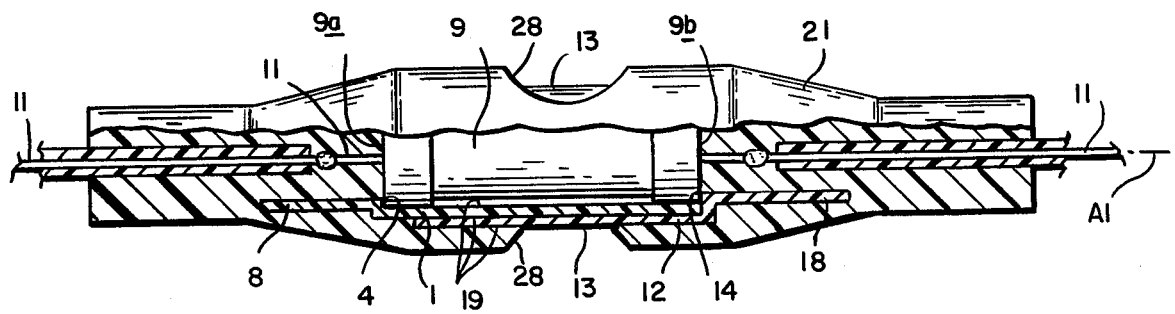
FIG. 6 is a sectional view of the resistor in FIG. 2 insulated according to the invention.

The outer insulative body 21 shown in FIGS. 4, 5 and 6 can be formed by high pressure injection molding with molten polypropylene (not shown) to protectively encapsulate the resistor 2 and the first sleeve 1 contained within the second sleeve 12. A high pressure injection mold 22 having a first-half member 22a and a second-half member 22b separated by a central parting line 23 includes upper and lower saddle ended studs 24 and 26 oppositely disposed and extending inward of the mold cavity (not shown) at its middle. When the mold halves 22a and 22b are clamped together, the second sleeve 12, containing the first sleeve 1 and resistor 2, is gripped and positively located within the mold cavity (not shown) by the upper and lower saddle ended studs 24 and 26 whose ends are shaped to extend slightly around the sides of the second sleeve 12. A hot, fluid, insulating thermoplastic, such as polypropylene, nylon or vinyl resin is then injected through a gate 27, shown in FIG. 5, at a high pressure so as to flow around all the exposed areas or parts of the first and second sleeves 1 and 12 to form an outer insulative jacket 21 shown in FIGS. 4, 5, and 6. Upon separation of the mold halves 22a and 22b two apertures 28 in the insulative jacket 21, shown in FIG. 6, exposing the exterior of the second sleeve 12 are revealed, the aperatures 28 having been formed due to the physical presence and location of the saddle ended studs 24 and 26 within the mold cavity (not shown). Alternatively, the outer insulative jacket 21 shown in FIGS. 4, 5 and 6 can be formed by substituting a heat shrunken sleeve for the injection molded insulating plastic. In both cases the jacket grips and holds the sleeves 1 and 12 in telescoped position confining the component 9 against axial movement.

Minimum high voltage leakage is achieved by the presence of the internal abutments 4 and 14 and the telescoping tubular bodies 3 and 13 of the first and second sleeves 1 and 12 respectively. As the internal abutments 4 and 14 serve to position the resistor 2 in a definite place for central axial alignment, the tubular bodies 3 and 13 center the resistor 2 radially on an axis A1 shown in FIG. 6. The resultant axial and radial centering of the resistor 2 along the axis A1 maximizes the subsequent insulation thickness provided by the outer insulative jacket 21 that is formed by either injection molding or heat shrink to hold the two telescoping sleeves 1 and 12.

The convoluted path 19, shown in FIG. 6, is formed outwardly from the resistor 2 to the exterior by the telescoping sleeves 1 and 12. The convoluted path 19 runs from the resistor body 9 past the second sleeve end wall 14, thence through the space between the first and second sleeves 1 and 12 and then turning back along the outer sleeve 12 to the opening 28. This convoluted path 19 is longer than the linear path axially of the body 21 from the resistor 2 to the exterior of the body 21 thereby minimizing high voltage leakage.

This physical structure of the telescoping tubular bodies 3 and 13 of the first and second sleeves 1 and 12, being dimensioned to receive the resistor 2 successively, further facilitates the assembly of the resistor 2 and sleeves for subsequent encapsulation.

It should be understood that this disclosure is for the purpose of illustration only and that this invention includes all modifications and equivalents which fall within the scope of the appended claims.

We claim:

1. An insulated high voltage electrical component comprising:
    a first sleeve of insulative material telescoping over the component;
    a second sleeve of insulative material telescoping over the first sleeve, the first sleeve including an abutment engaging one end of the component and the second sleeve including another abutment engaging the other end of the component; and
    a body of insulative material molded around the sleeves to hold the sleeves in telescoped position, the telescoped sleeves forming a convoluted path outwardly from the component.

2. An insulated component according to claim 1 wherein the body has an opening to the second sleeve intermediate the ends thereof and at the end of the convoluted path.

3. An insulated component according to claim 1 wherein the convoluted path is longer than the axial path to the exterior of the body.

4. An insulated component according to claim 1 wherein the component has axial lead wires along which there is a potential leakage path shorter than the convoluted path.

5. An insulated component according to claim 1 wherein the body is of molded thermoplastic material.

6. A method for insulating a high voltage electrical component comprising:
    inserting the electrical component into a first sleeve of insulative material telescoping over the component with an abutment on the first sleeve engaging one end of the component;
    telescoping the first sleeve and electrical component into a second sleeve of insulative material with an abutment on the second sleeve engaging the opposite end of the component;
    encapsulating the sleeves with insulative material to form a molded body confining the sleeves and electrical component in telescoped position.

* * * * *